May 17, 1960 G. SORLINI 2,936,696
DEVICE FOR PROCESSING A LIQUID
Filed Nov. 14, 1957
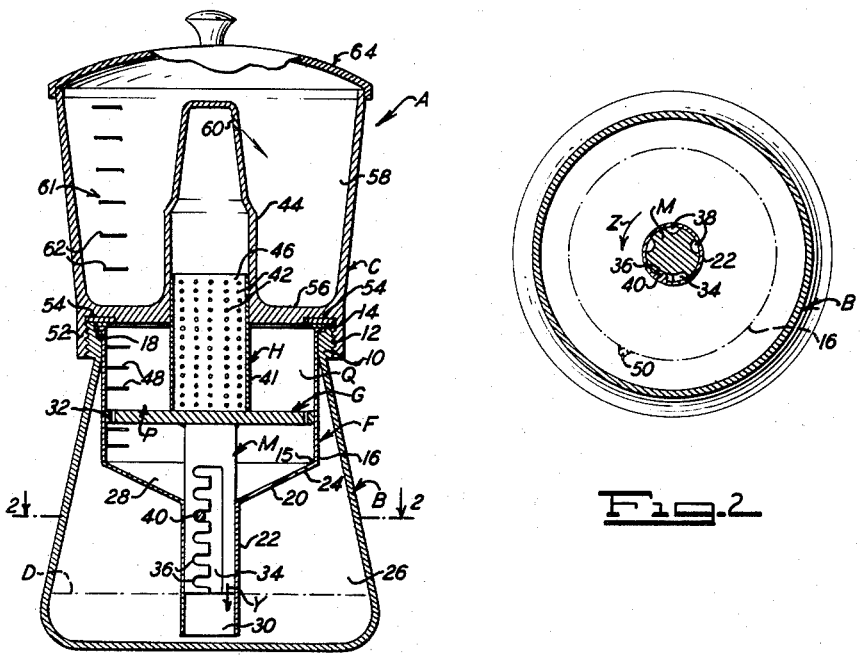
Fig.1
Fig.2
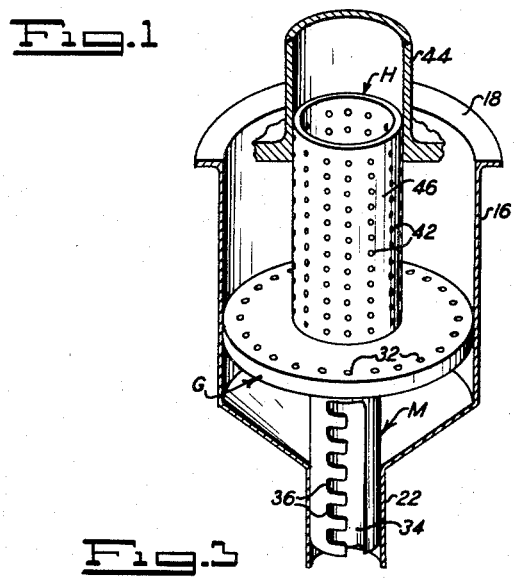
Fig.3
INVENTOR.
GIOVANNI SORLINI United States Patent Office 2,936,696
Patented May 17, 1960

2,936,696

DEVICE FOR PROCESSING A LIQUID

Giovanni Sorlini, Brescia, Italy, assignor to Alessandro Ballarini, Carlo Ballarini, and Emilio Ballarini, all of Rivarolo Mantovano, Italy Application November 14, 1957, Serial No. 696,530

Claims priority, application Italy November 30, 1956

6 Claims. (Cl. 99—303)

This invention relates to devices for the preparation of infusions and of the kind actuated by a rising flow of liquid.

Devices of the rising water flow type, as heretofore used for preparing infusions, are embodied in such a manner that satisfactory results are not obtained when the amount of prepared infusion is to be changed. In other words: if a device of this kind is arranged for giving six cups of infusion, then it does not operate with the same efficiency when only three cups are required. As a matter of fact, the container usually provided for the ground substance or substance to be infused generally has a well defined capacity and a well determined quantity of ground coffee or other such substance can be accommodated therein; however, with a smaller amount of ground substance a different resistance to water percolation results.

Moreover, known devices do not have sufficient filtering area and the quantity of grounds resulting in the infusion itself increases inversely as the charge of ground substance.

Note is also to be taken of the fact that a conventional device for preparing, for example, mix cups of infusion may be left inoperative for long times and such idle time results in oxidation and the possible growth of moulds, whereby a disagreeable smell and taste are imparted to subsequent infusions.

It is also to be noted that in known devices—as for instance of six cup capacity—it is not possible to balance the pressure prevailing in the lower container and in the ground substance holder or "basket," whereby—above all when only a small quantity of water is used for preparing the infusion—the pressure that is built-up within the container will quickly attain the limit at which said small quantity of water is forcibly percolated, at a relatively low temperature, through the ground substance, and a very poor infusion is thereby obtained.

The aforestated and further drawbacks are wholly prevented by the invention which provides a device for preparing infusions, and particularly coffee infusions, of the type operated by a rising flow of water and comprising two containers tightly connected to one another namely a lower water container and an upper infusion container and means to hold the ground coffee or the like and to allow water to percolate therethrough inserted between said two containers. Such device is characterized in that said means comprises controllably movable members, which can be locked at given levels in order to define different sizes of containers for ground substance; said means also comprises further members, also movable and operatively connected with the aforestated ones, having a suitable filter wall, the filtering area of which is altered or adjusted according to the level reached by aforestated movable members, to define a suitable holding space for the ground substance.

The above and further features of the invention will next be disclosed in the following description of a preferred embodiment thereof, with reference to the accompanying drawings in which:

Fig. 1 is a vertical sectional view of a preferred embodiment of the invention, showing the strainer adjusted to such a level as to cause a decreasing in the ground product holding space from the normal six cup capacity of device to a three cup capacity.

Fig. 2 is a cross-sectional view of the device along line X—X of Fig. 1.

Fig. 3 is a partially broken away view of the movable members and filter means in lowest position, that is for a maximum capacity of six cups.

Referring now to Fig. 1, the device A for the preparation of infusions consists of two coupled containers B, C, made for instance of cast or deep-drawn aluminum. The lower container B is filled with water, whereas the coffee infusion is collected in the upper container C. The lower container B is formed with an upper cylindrical extension 10, having an outside threaded section 12, and an abutment 14 is formed on the upper edge of the inside of said cylindrical extension, for purposes which will be stated hereafter. The "basket" or holder F is fitted within the container B in a substantially centered position and has a cylindrical, solid wall 16, the upper edge of which is flanged so as to form a peripheral rim 18, perpendicular to the holder axis and resting on the abutment 14, thereby supporting the holder F. The lower end of cylindrical wall 16 is closed by a truncated cone shaped section 20 and by a cylindrical tubular extension 22. The inside space 26 of container B is put into communication with the inside space 28 of holder F through only one opening 24, formed in section 20 of holder F. The lower end 30 of tubular extension 22 is immersed in the quantity of water D required for preparing three cups of infusion.

The strainer or movable bottom G, slidingly fitted in the cylindrical section of holder F, consists of a circular disc of suitable thickness and solid except for a series of perforations drilled adjacent its outer edge. A rod M, whose cross-section is clearly illustrated in Fig. 2, is centrally secured to the lower side of strainer G. This rod is also solid, except for a longitudinal recess 34, formed with seats 36 which extend to the axis of said recess; in the case considered, six seats are provided, thereby giving six levels to which the strainer G can be brought, and thus six different capacities of holder are provided. Grooves 38 are cut longitudinally on the entire outside surface of rod M, whereby the water is allowed to flow through the tubular extension 22—more precisely through the channels defined by said grooves 38—and into the holder F. Thus, the inside space of said holder is put into hydrodynamic communication with the container B, through the extension 22.

A dowel or pin 40, formed on the inside cylindrical surface of tubular extension 22, cooperates with the recess 34 and can be brought by the user into engagement with any of seats 36 as required. In the case shown, the dowel 40 is engaged with the third seat from below. The filter element H is fitted on the side of strainer G opposite to that of rod M on the upper circular face of strainer. Such filter element consists of a cylindrical wall 46, having a plurality of perforations 42 drilled perpendicularly to the wall axis, and in such a number such as to meet the filtering requirements. The filter element H cooperates with the associated hollow projection or cylindrical portion 44, formed on the container C. The inside surface of cylindrical wall 16 of container F has a scale 48 which, in the case considered, consists of six linear scale divisions, thus allowing the user of device A to adjust the strainer G to the required level, in order to define a space in the holder sufficient to contain the required quantity of ground coffee. In the case shown, the adjustment has been made to the third scale division (from above). The holder F is moreover provided with a further reference, as for instance a recess 50, or a projection, or the like, formed on the same vertical plane as dowel 40, whereby when the rod M is inserted by the operator into the extension 22, the dowel 40 is brought into engagement with one of seats 34, and not with one of grooves 38. The upper container C is connected in water tight manner with the lower container B, by screwing the inside threaded cylindrical section 52 onto the outside threaded section 12 on the lower container B, the resilient packing ring 54 being interposed therebetween. This packing ring is fitted into a circular seat, formed adjacent the outer edge of bottom 56 of container C. This bottom is shaped as an annular crown, and its thickness is preferably comparatively great, in order to have the lower container conveniently heat insulated with respect to the upper container. The bottom 56 is connected with the afore-described cylindrical wall 44, through which the infusion rises to be discharged into the cavity 58 of container C through the orifice 60, as formed on said extension 46. The inside wall of cavity 58 has a scale 61 that consists of the six linear scale divisions 62, by which the levels of water to be poured into the container B for preparing a quantity of infusion ranging from one to six cups, are defined, said levels being inclusive of the quantity of water required to act as a "cushion." The device A is completed by a cover 64, the upper edge of container C being formed with a spout, by which pouring of the infusion collected within said cavity 58 into the cups is allowed.

From what has been stated above, the advantages and the operation of device for the preparation of infusions according to the invention will be apparent. Assuming that the user intends to obtain a quantity of infusion corresponding to three cups, while having available only a device of a far greater capacity, it will be sufficient to pour into the cavity 58 of container C, water up to the level defined by the third (from below) linear division of scale 61, after unscrewing the container C from container B, and the removal therefrom of the holder F, together with the members defining the useful holding space, and with the filter means. The quantity of water thus measured is then transferred into the cavity of container B, in which it will reach the level shown in Fig. 1, whereupon the holder F is fitted in place, bringing its flange 18 to rest on the abutment 14. The strainer G, together with the associated members H and M, is then conveniently adjusted. More precisely, the rod M is threaded into the extension 22, thus registering the recess 34 with the dowel 40, whereby rod M can be moved downward in the direction of arrow Y, until the strainer G is flush with the mark 3 of scale 48. Then, by turning the strainer G in the direction of arrow 4, the dowel 40 will engage itself in the selected seat 36, whereby said strainer is locked at the selected level, by defining with its upper side, a space P of such size as exactly required to contain the quantity of ground substance needed for preparing three cups of infusion, such space being cylindrically shaped and defined by the lower annular portion of strainer G, by the upper annular wall 56 and by the cylindrical side walls 16 and 41 of holder F and filter H respectively. The quantity Q of ground coffee is then charged into said space and suitably compacted therein, whereupon the container C is screwed onto the container B, and accordingly a given length of filter H is inserted into the cylindrical portion 44. Obviously, only the portion of filter wall 41 underneath bottom 56 will be utilized for preparing the infusion, and such operating portion will have a number of orifices 42 as exactly required for the percolation of said quantity Q of ground coffee, thus having the strainer G and the filter H adjusted to different levels, and the capacity of space P and the area of operating surface of filter H accordingly altered. Practically, when the strainer G has been adjusted to its lowest position, that is registering with the lowest linear division of scale 48 (which might be also omitted, since said strainer comes to rest against the holder edge 15), and thus the dowel 40 is engaged with the uppermost seat 36 (which might be also omitted) of rod M, the maximum capacity of space P will be attained, that is a quantity Q of ground coffee sufficient for six cups of infusion can be charged therein. The area of the operating surface of the filter wall 11 will be the greatest possible, as the filter H is nearly wholly out of cylindrical section 44. When the strainer G is moved in a direction opposite to that of arrow Y, up to its highest level, and the members associated therewith are accordingly positioned, the space P and the operating area of filter wall 41 are decreased down to the minimum of their capacity. Then, after bringing the device A, containing the quantity of water B, into contact with a heat source, a steam pressure is built-up whereby after some time, same water will be driven in a direction opposite to that of arrow Y, into the extension 22, through the grooves 38 and the perforated edge portion of strainer G into the ground coffee Q, whereby the active and flavoring compounds thereof are removed or extracted therefrom. Then the infusion is filtered through the perforations 42 and discharged through the orifice 60 into the cavity 58, the path of water being suitably extended in such a manner as to effect treatment of the whole quantity Q of ground coffee. Thus, even with the smallest quantity of ground substance, an infusion is obtained that has a taste and flavour exactly like those of an infusion prepared with the largest quantity of ground coffee, corresponding to six cups of infusion.

The orifice 24 is particularly advantageous when small quantities of infusion such as one or two cups are to be prepared. In fact, due to different compressibility features of water D and the overlying air layer, any increase in the temperature, and thus the higher pressure which is built-up in said air layer, would cause, in the absence of said orifice 24, a nearly instantaneous flowing of a small quantity of water through the strainer G and filter H. As consequence thereof, only a small fraction of ground coffee would be treated, and a nearly cold infusion would be collected in the cavity 58. However, through said orifice 24, the pressures within the container B and within the holder F are conveniently balanced, and consequently, in addition to a pre-moistening action on ground coffee by the part of steam that is discharged through the orifice 24, a much slower percolating action is effected by the water flowing upwards which, in the meantime, attains its optimum temperature. The use of a thick bottom 56 serves to prevent overheating—with a consequent boiling and degradation of the infusion collected on said bottom—which might be caused by the steam developed when the water cushion, present in the container B, is boiled away and flows through the extension 22 and perforations 32. By the use of a thick bottom, or at any rate by providing said bottom with a suitable layer of heat insulating material, a sufficient thermal insulation can be obtained.

It is to be understood from what is above stated, that many combinations of dilution or concentration of infusion can be obtained with the device provided according to the invention; thus, for instance, a diluted infusion can be obtained by charging the holder with the quantity of ground coffee as required for four cups, and pouring into the lower container the quantity of water required for six cups, while a more concentrated infusion can be obtained by decreasing the quantity of water.

In Fig. 3, the strainer G is shown in its lowest position, whereby a maximum of operating area of filter H is exposed, and a quantity of ground coffee Q as needed for preparing the whole quantity of infusion is charged in the holder.

While the invention has been described in detail it is to be understood that the description is for the purpose of illustration only, and is not definitive of the limits of the inventive idea.

What I claim is:

1. A device for processing a liquid comprising a first container for supplying the liquid, a second container superposed on the first container for receiving the liquid, a bottom in the second container including an upwardly extending hollow projection opening into the first and second containers, a holder in the first container for holding material to be subjected to the liquid, a perforated movable bottom in the holder defining with the first said bottom a variable depth for said material, a perforated strainer on the movable bottom of the holder and extending into the projection, means for varying the position of the second said bottom and thus the extension of the strainer into said projection, and means coupling the holder to the first container and defining a passage for the flow of the liquid from the first container to the holder whereat the liquid passes through the perforated bottom and through the strainer and through the projection to the second container.

2. A device as claimed in claim 1 wherein the holder is a cylindrical hollow body having an open top and including a bottom defining an opening and the second said means is a tubular extension extending downwardly from the bottom of the holder at said opening.

3. A device as claimed in claim 2 wherein the first said means comprises a first body defining a series of vertically spaced horizontal slots opening into a common vertical slot and a second body including a pin selectively positionable in the horizontal slots, one of said bodies being coupled to the movable bottom and the other of said bodies being coupled to the tubular extension whereby the position of the movable bottom is adjustable.

4. A device as claimed in claim 3 wherein the bodies are in the tubular extension, at least one of the bodies defining axial openings for the flow of the liquid.

5. A device as claimed in claim 4 wherein the movable bottom defines peripheral openings for the flow of the liquid.

6. A device as claimed in claim 1 wherein the first and second containers are threadably engaged.

References Cited in the file of this patent

UNITED STATES PATENTS

| | | |
|---|---|---|
| 797,478 | Wells | Aug. 15, 1905 |
| 948,108 | Edtbauer | Feb. 1, 1910 |
| 1,309,414 | Huning | July 8, 1919 |
| 1,991,198 | Edtbauer | Feb. 12, 1935 |
| 2,383,144 | Moore | Aug. 21, 1945 |

FOREIGN PATENTS

| | | |
|---|---|---|
| 443,130 | Italy | Dec. 10, 1948 |
| 443,477 | Italy | Dec. 22, 1948 |